Patented June 6, 1933

1,912,641

UNITED STATES PATENT OFFICE

ROBERT GILBERT JAMES, OF SELLY OAK, BIRMINGHAM, AND DOUGLAS FRANK TWISS, OF WYLDE GREEN, ENGLAND, ASSIGNORS TO DUNLOP RUBBER COMPANY LIMITED, A BRITISH COMPANY

MANUFACTURE OF COLORED ARTICLES FROM DISPERSIONS OF RUBBER OR THE LIKE

No Drawing. Application filed November 7, 1930, Serial No. 494,188, and in Great Britain December 12, 1929.

This invention relates to a method for coloring articles obtained, by any one or more of the operations such as dipping, spreading, painting, extruding, spraying, electrophoresis, impregnating or moulding, from aqueous dispersions containing organic materials, particularly rubber, the individual particles of which normally possess electro-negative charges.

The object of the invention is to impart substantially fixed colorations to articles obtained from the aqueous dispersions aforesaid by admixing therewith soluble basic organic dyestuffs, the colored ions of which are cathions.

According to the invention the colorations are imparted by converting the electro-negative charges of the individual particles of the aqueous dispersions aforesaid into electro-positive charges and thereafter admixing with the aforesaid dispersions the soluble basic organic dyestuffs, the colored ions of which are cathions.

If such dyestuffs as the triphenylmethane derivatives are introduced into alkaline aqueous dispersions aforesaid the alkalinity of the dispersions tends to cause the dyestuffs to revert to the insoluble and colorless base and, moreover, as the adsorbed colored dyestuff ion has a positive charge there will be a tendency towards a neutralization or even reversal of the negative charge normally possessed by the rubber or other disperse particles present in the mixture, thus rendering the dispersions insoluble and liable to incipient or total coagulation.

The same instability is produced if such soluble dyestuffs are introduced into neutral or even slightly acid dispersions so long as the individual particles of these possess their elctro-negative charges.

In contradistinction, however, if a stable dispersion is produced, for example, by adjusting the pH value to the acid side of the iso-electric point and converting the electro-negative charges of the individual particles of the aqueous dispersions into electro-positive charges, these charges will not tend to be neutralized or reversed on the addition of solutions of dyestuffs, the colored ions of which are cathions.

The addition of such dyestuffs will not effect precipitation of the dispersed particles in the dispersions. In fact, such additions may tend to further stabilize such dispersions.

It has been found that the dispersions aforesaid which have had the electro-negative charges of the individual particles converted into electro-positive charges, as for example, by the addition of acid upon admixture with the soluble organic dyestuffs referred to become very stable.

It has, moreover, been found that such colored dispersions on being subjected to, for example, electrophoresis by any of the methods described in copending application Ser. No. 417,252 give homogeneous colored deposits of rubber or the like at the cathode.

It has also been found that colored dispersions produced according to the present invention can be used as prior coatings in processes for the manufacture of articles of or containing rubber or similar material from aqueous emulsions or dispersions thereof comprising coating supports or backing strata with the aqueous emulsions or dispersions of the aforesaid kinds which have been previously acidified and are of acid reaction and thereafter coating the thus treated supports or backing strata with the main emulsions or dispersions aforesaid to facilitate the coagulation of the main dispersions which are subsequently applied and which may in addition be colorless.

Colored articles, if desired, of appreciable thickness, can also be produced by the application of colored primary and if desired alternating coagulating layers as these layers can impart their shade to the whole thickness of the resulting articles upon drying and vulcanizing.

The invention has been found to be particularly applicable to natural or artificial aqueous dispersions of rubber or similar vegetable resins such as gutta-percha or balata with or without the addition of aqueous dispersions or emulsions of rubber-like substances such as the so-called synthetic rubbers or mineral rubbers, or rubber substitutes such as factice or rubber reclaim or rubber waste or oils, for example, rape oil, or vulcanized oils or cellulose esters, or ethers or proteins, for example, casein.

The dispersions may be concentrated and/or compounded or compounded and subsequently concentrated. The compounding ingredients may be chosen from vulcanizing agents such as sulphur, fillers and reinforcing agents such as clay, barium sulphate, lithopone, lamp black, gas black, zinc stearate or even ebonite or vulcanite, accelerators of vulcanization; coloring matters and preservatives or softeners.

Compounded concentrates such as are described in Patent No. 1,846,164, February 23, 1932 to which may be added any one or more of the usual well known compounding ingredients are particularly suitable for use.

Aqueous dispersions or emulsions of synthetic rubbers with or without any one or more of the hereinbefore mentioned compounding ingredients may also be employed.

Dyestuffs having colored cathions comprise the triphenylmethane derivatives, as for example, malachite green or methyl violet, crystal violet and such sulphur-containing dyes as for example, methylene blue and also the basic phthalein dyestuffs such as Rhodamine B.

Examples of carrying the invention into effect are as follows:—

Example 1

An acid latex dispersion of the following composition:—

| | Parts by weight |
|---|---|
| Rubber | 46 |
| Acetic acid | 32 |
| Casein | 0.93 |
| Water | 130 | is prepared by wetting the casein with ten times its weight of warm water (50° C.) and adding ammonia little by little with constant stirring until an opalescent colloidal solution is formed, then adding an equal volume of water and mixing the solution with the required amount of latex together with sufficient water to give a final rubber content of 30%. The original alkalinity of the latex should be reduced to give a low alkalinity in the final casein latex mixture, e. g. 0.01 or less expressed as ammonia on the total volume.

A solution consisting of the stated proportion of acetic acid mixture with half its volume of water is then added as rapidly as possible to the casein latex dispersion with continuous stirring. The acid latex so obtained is filtered, for example, through muslin gauze. To 100 parts of the acid latex so obtained 1 part of crystalline methyl violet dissolved in a little 20% acetic acid is added with stirring. On subjecting such violet colored acid dispersions to electrophoresis using suitably shaped cathodes or cathode surrounds as described in, for example, copending application Serial No. 417,253 nonporous violet colored articles of rubber are obtained.

Example 2

A shaped former or mould is dipped into a violet colored acid dispersion obtained as described in Example 1. On withdrawal of the former or mould and with or without allowing the acid coating partially to dry the former or mould can then be dipped into a normal compounded latex mixing containing for example, 60% total solids of the following composition:—

| | Parts by weight |
|---|---|
| Rubber | 91.7 |
| Sulphur | 2.5 |
| Accelerator | 0.3 |
| Zinc oxide | 0.5 |
| Mineral oil | 5.0 | made according to application Ser. No. 232,705. The former or mould is allowed to remain immersed in this mixing for 5 to 20 seconds according to the thickness of the deposit desired. It is then withdrawn, inverted and allowed to stand. Within 30 to 60 seconds after removal the deposit sets throughout and upon subsequent drying and vulcanization in known manner a violet colored rubber article is obtained.

If desired, a deeper coloring can be obtained if after withdrawal from the normal mixing the former or mould is again dipped into the color-containing acid dispersion before final drying and vulcanization. By continued alternate dipping of the former or mould into the two dispersions a violet colored article of appreciable thickness can be built up which after final drying and vulcanization in known manner will be found to be colored throughout.

Having now particularly described and ascertained the nature of our said invention and in what manner the same is to be performed, we declare that what we claim is:—

1. A method for coloring articles obtained from aqueous dispersions containing organic materials particularly rubber, the individual particles of which normally possess electro-negative charges, which comprises converting the electro-negative charges of the individual particles of the aqueous dispersions aforesaid into electro-positive charges and thereafter admixing with the aforesaid dispersions soluble basic organic dyestuffs, the colored ions of which are cathions.

2. A method as claimed in claim 1 wherein the pH value of aqueous dispersions aforesaid is adjusted to the acid side of the isoelectric point and thereby converting the electro-negative charges of the individual particles of the aqueous dispersions into electro-positive charges.

3. A method as claimed in claim 1, wherein the colored dispersions obtained are subjected to electrophoresis on a porous cathode surface.

4. A method as claimed in claim 1, wherein the colored dispersions produced are used as prior coatings in processes for the manufacture of articles of or containing rubber or similar material from aqueous emulsions or dispersions and subsequently applying and coagulating a main adhering dispersion which is subsequently applied and which may in addition be colorless.

In witness whereof, we have hereunto signed our names.

ROBERT GILBERT JAMES.
DOUGLAS FRANK TWISS.